(12) United States Patent
Ratner et al.

(10) Patent No.: US 12,487,872 B2
(45) Date of Patent: Dec. 2, 2025

(54) SYSTEMS AND METHODS FOR ANOMALY DETECTION IN MULTI-MODAL DATA STREAMS

(71) Applicant: The Board of Trustees of the Leland Stanford Junior University, Stanford, CA (US)

(72) Inventors: Daniel Ratner, San Francisco, CA (US); Eric Felix Darve, Foster City, CA (US); Ryan Humble, San Francisco, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 18/338,222

(22) Filed: Jun. 20, 2023

(65) Prior Publication Data

US 2023/0409422 A1 Dec. 21, 2023

Related U.S. Application Data

(60) Provisional application No. 63/366,604, filed on Jun. 17, 2022.

(51) Int. Cl.
*G06F 11/07* (2006.01)
*G06F 11/00* (2006.01)

(52) U.S. Cl.
CPC .......... *G06F 11/0751* (2013.01); *G06F 11/00* (2013.01)

(58) Field of Classification Search
CPC ............... G06F 11/0751; G06F 21/552; G06F 2221/034; G06F 11/3006; G06F 11/3409; G06F 11/3452; G06F 11/3447; G06F 21/566; G06F 2201/81; G06N 3/084; G06N 5/045; H04L 63/1425; H04L 63/1408; H04L 41/064; H04L 43/16; H04L 3/08; H04L 43/062
See application file for complete search history.

(56) References Cited

U.S. PATENT DOCUMENTS 10,193,913 B2 * 1/2019 Machlica .............. G06F 21/552
11,151,713 B2 * 10/2021 Kumbhare ............ G06T 7/0004
(Continued)

OTHER PUBLICATIONS

Andrew et al., "Deep Canonical Correlation Analysis", Proceedings of the 30th International Conference on Machine Learning, No. 3 in Proceedings of Machine Learning Research (PMLR), Jun. 17-19, 2013, pp. 1247-1255.

(Continued)

*Primary Examiner* — Justin R Knapp
(74) *Attorney, Agent, or Firm* — KPPB LLP

(57) ABSTRACT

Systems and method for detecting anomalies in accordance with embodiments of the invention are illustrated. One embodiment includes receiving a first data stream collected from a first sensor, identifying a first set of anomalies in the first data stream using a first model, receiving a second data stream collected from a second sensor, identifying a second set of anomalies in the second data stream using a second model, determining a set of joint anomalies using the first set of anomalies, second set of anomalies, and a threshold, wherein a threshold is some time period, and updating how anomalies are identified in the first and second set of models using the set of joint anomalies.

20 Claims, 7 Drawing Sheets

(56) References Cited

U.S. PATENT DOCUMENTS

| | | | |
|---|---|---|---|
| 11,169,514 B2* | 11/2021 | Song | G06N 3/045 |
| 11,537,116 B2* | 12/2022 | Heikkilä | G05B 23/0221 |
| 2015/0143913 A1* | 5/2015 | Adams | G06V 20/52 |
| | | | 382/104 |
| 2017/0220801 A1 | 8/2017 | Stockdale et al. | |
| 2017/0230391 A1 | 8/2017 | Ferguson et al. | |
| 2017/0230392 A1 | 8/2017 | Dean et al. | |
| 2020/0351283 A1* | 11/2020 | Salunke | H04L 63/1425 |
| 2023/0353588 A1* | 11/2023 | Geethanath | H04L 63/1425 |
| 2024/0212350 A1* | 6/2024 | Das | G06V 10/44 |
| 2024/0351209 A1* | 10/2024 | Graabæk | G06N 20/00 |

OTHER PUBLICATIONS

Breunig et al., "LOF: Identifying Density-Based Local Outliers", ACM SIGMOD Record, vol. 29, No. 2, May 16, 2000, pp. 93-104, doi: 10.1145/335191.335388.

Challu et al., "Deep Generative model with Hierarchical Latent Factors for Time Series Anomaly Detection", Proceedings of the 25th International Conference on Artificial Intelligence and Statistics, PMLR, vol. 151, 2022, pp. 1643-1654.

Chen et al., "Outlier Detection with Autoencoder Ensembles", Proceedings of the 2017 SIAM International Conference on Data Mining, 2017, pp. 90-98, doi: 10.1137/1.9781611974973.11.

Liu et al., "Generative Adversarial Active Learning for Unsupervised Outlier Detection", IEEE Transactions on Knowledge and Data Engineering, vol. 32, No. 8, Aug. 1, 2020, pp. 1517-1528, doi: 10.1109/TKDE.2019.2905606.

Liu et al., "Isolation Forest", Eighth IEEE International Conference on Data Mining, Dec. 2008, pp. 413-422, doi: 10.1109/ICDM.2008.17.

Luo et al., "ViTac: Feature Sharing Between Vision and Tactile Sensing for Cloth Texture Recognition", IEEE International Conference on Robotics and Automation (ICRA), May 2018, pp. 2722-2727, doi: 10.1109/ICRA.2018.8460494.

Parzen, "On Estimation of a Probability Density Function and Mode", Annals of Mathematical Statistics, vol. 33, No. 3, Sep. 1962, pp. 1065-1076, doi: 10.1214/aoms/1177704472.

Reynolds, "Gaussian mixture models", Encyclopedia of Biometrics. Springer, 2009, pp. 659-663, doi: 10.1007/978-0-387-73003-5_196.

Ruff et al., "Deep One-Class Classification", Proceedings of the 35th International Conference on Machine Learning, Stockholm, Sweden, PMLR, vol. 80, Jul. 10-15, 2018, pp. 4393-4402.

Schlegl et al., "f-AnoGAN: Fast unsupervised anomaly detection with generative adversarial networks", Medical Image Analysis, vol. 54, May 2019, pp. 30-44, doi: 10.1016/j.media.2019.01.010.

Schlegl et al., "Unsupervised Anomaly Detection with Generative Adversarial Networks to Guide Marker Discovery", Information Processing in Medical Imaging, vol. 10265, May 23, 2017, pp. 146-157, doi: 10.1007/978-3-319-59050-9_12.

Schölkopf et al., "Estimating the Support of a High-Dimensional Distribution", Neural Computation, vol. 13, No. 7, Jul. 2001, pp. 1443-1471, doi: 10.1162/089976601750264965.

Shen et al., "Timeseries Anomaly Detection using Temporal Hierarchical One-Class Network", NIPS'20: Proceedings of the 34th International Conference on Neural Information Processing Systems, vol. 1092, Dec. 6, 2020, pp. 13016-13026.

Su et al., "Robust Anomaly Detection for Multivariate Time Series through Stochastic Recurrent Neural Network", Proceedings of the 25th ACM SIGKDD International Conference on Knowledge Discovery & Data Mining—KDD '19, Aug. 4-8, 2019, pp. 2828-2837, doi: 10.1145/3292500.3330672.

Yang et al., "Regularized Cycle Consistent Generative Adversarial Network for Anomaly Detection", 24th European Conference on Artificial Intelligence (ECAI), IOS Press, 2020, pp. 1618-1625, doi: 10.3233/FAIA200272.

Zenati et al., "Adversarially Learned Anomaly Detection", Proceedings of the IEEE International Conference on Data Mining, Nov. 17-20, 2018, pp. 727-736, doi: 10.1109/ICDM.2018.00088.

Zhou et al., "VAE-based Deep SVDD for anomaly detection", Neurocomputing, vol. 453, Sep. 17, 2021, pp. 131-140, doi: 10.1016/j.neucom.2021.04.089.

* cited by examiner

SYSTEMS AND METHODS FOR ANOMALY DETECTION IN MULTI-MODAL DATA STREAMS

CROSS-REFERENCE TO RELATED APPLICATIONS

The current application claims the benefit of and priority under 35 U.S.C. § 119(e) to U.S. Provisional Patent Application No. 63/366,604 entitled "Systems and Methods for Anomaly Detection in Multi-Modal Data Streams" filed Jun. 17, 2022. The disclosure of U.S. Provisional Patent Application No. 63/366,604 is hereby incorporated by reference in its entirety for all purposes.

STATEMENT OF FEDERAL SUPPORT

This invention was made with Government support under contract DE-AC02-76SF00515 awarded by the Department of Energy. The government has certain rights in the invention.

FIELD OF THE INVENTION

The present invention generally relates to anomaly detection and, more specifically, anomaly detection in multi-modal data.

BACKGROUND

Anomaly detection is the identification of rare events, items, and/or observations that deviate significantly from the majority of a given data or do not otherwise conform to a pre-defined behavior. The ability to detect anomalies is highly desirable in many different fields, including (but not limited to) manufacturing, cyber security, medicine, and many others. Failures in these systems can lead to low yield, faulty products, or even damage to components, making identifying these failures a high-priority task for system operators. However, the complexity of these systems typically ensures that labeled data is rare or nonexistent and expensive to acquire.

Most methods for anomaly detection define as a data point or data sample a vector formed by the collection of all data streams at a given time, e.g., obtained by collecting measurements from all sensors at a given time. Then, based on measuring the distance between the query data point and all the data points in the reference training set of clean (i.e., not anomalous) samples, they predict whether the query data point is anomalous or not. These methods, by definition, assume that a reference training set is provided.

SUMMARY OF THE INVENTION

Systems and methods in accordance with various embodiments of the invention utilize technology to train models to detect anomalies in multi-modal data streams.

In an embodiment, a method to train models to detect anomalies in multi-modal data streams includes receiving a first data stream collected from a first sensor, identifying a first set of anomalies in the first data stream using a first model, receiving a second data stream collected from a second sensor, identifying a second set of anomalies in the second data stream using a second model, determining a set of joint anomalies using the first set of anomalies, second set of anomalies, and a threshold, wherein a threshold is a confidence level, and updating the first and second models using the set of joint anomalies.

In a further embodiment, updating the first and second models also includes updating the parameters of the first and second models.

Another further embodiment includes updating the parameters of the first and second models to more accurately identify anomalies.

A still further embodiment also includes updating the threshold to more accurately identify joint anomalies using the set of joint anomalies.

In a yet further embodiment, the first and second models are parameterized functions with modifiable parameters that balances confidence in the anomaly detection predictions and the number of anomalous events predicted.

In another embodiment, parameterized functions maximize the covariance of outputs of each of the parameterized functions.

In yet another embodiment, the parameterized functions maximize an unsupervised metric.

In a further embodiment again, the confidence in the anomaly detection predictions and number of detected anomalies are imputed from other parameters and are not directly exposed.

In still another embodiment, a sensor is a program that collects logs from a device.

A further additional embodiment includes generating output.

Another embodiment again includes displaying the output via a graphical interface, and sending the output over a network.

Still another embodiment again includes performing an event when there is high confidence that a joint anomaly is detected.

In yet another embodiment again, the event is an automatic shutoff.

Another additional embodiment includes receiving a third data stream collected from the first sensor, and identifying a third set of anomalies in the third data stream using the updated first model.

In still another additional embodiment, identifying the first set of anomalies is based on a set of one or more continuous functions.

In yet another additional embodiment again, at least one of the first and second models is a neural network.

In still yet another embodiment, a method of detecting manufacturing anomalies on an assembly line includes receiving a first data stream from a first sensor, where the first sensor sends data from a station on an assembly line, identifying a first set of anomalies in the first data stream using a first model, receiving a second data stream from a second sensor, where the second sensor sends data from another station on the assembly line, identifying a second set of anomalies in the second data stream using a second model, determining a set of joint anomalies using the first set of anomalies, second set of anomalies, and a threshold, and updating how anomalies are identified in the first and second set of models using the set of joint anomalies.

In still yet another embodiment again, the second sensor sends data from the final assembly line product.

In a further additional embodiment again, anomalies are represented by the group consisting of viruses, intrusions, and persistent threats.

In a still further additional embodiment, the data streams are represented by different medical diagnostics, and anomalies are represented by disease diagnoses.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will more fully understood with reference to the following figures and data graphs, which are presented as exemplary embodiments of the invention and should not be construed as a complete recitation of the scope of the invention.

DETAILED DESCRIPTION

Figure 1:
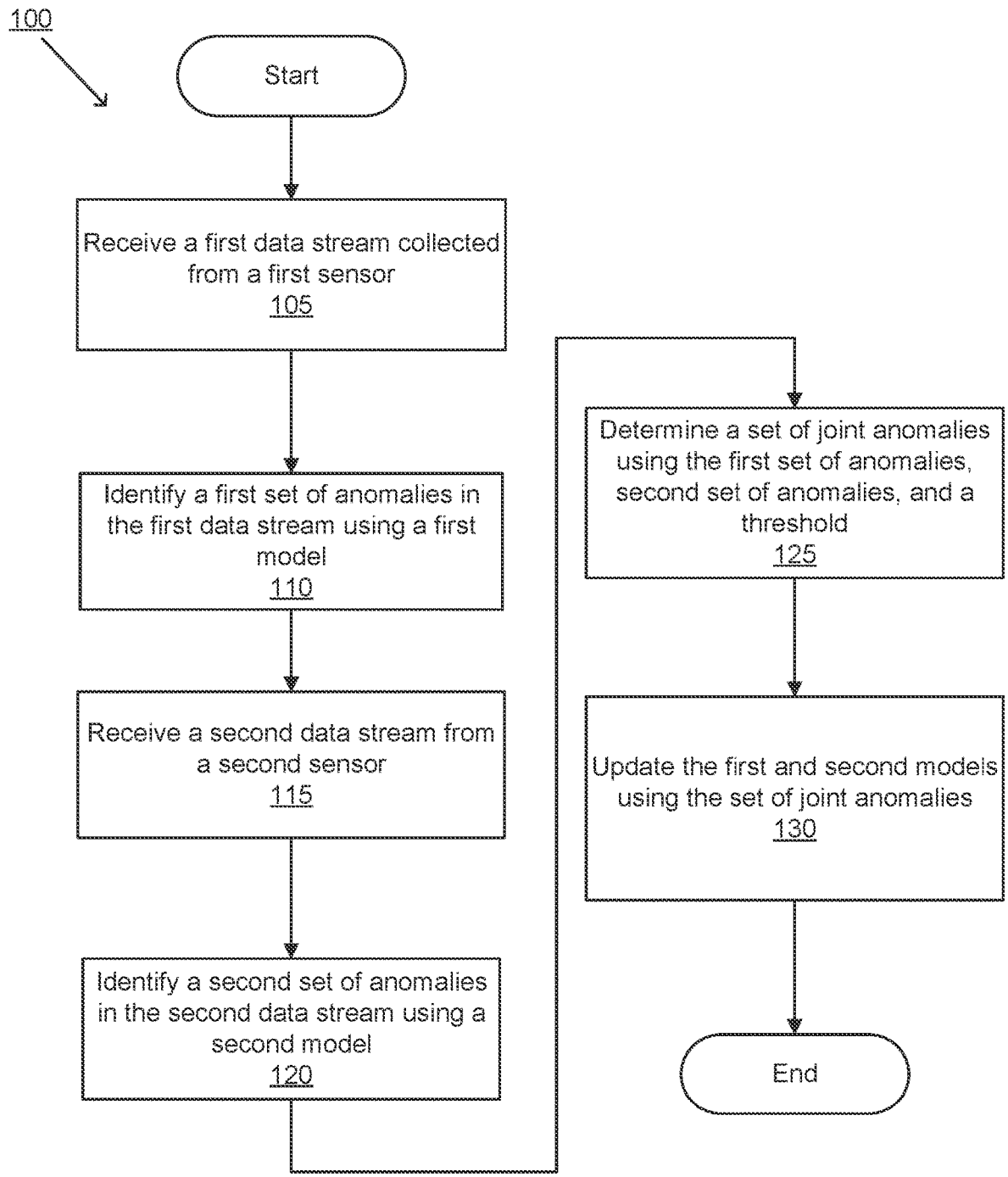
FIG. 1 is a flow chart illustrating a process to detect anomalies in accordance with an embodiment of the invention.

Current methods that attempt to make a prediction based on the statistical relationships between the data streams, for example, based on correlation, do not allow adjusting their prediction for noise and will only predict an anomalous sample when the confidence is maximum.

There are many challenges in searching for anomalies present in multi-modal data streams. In a large system of connected elements, a subsystem is considered anomalous if and only if it impacts the larger system's overall performance. In various embodiments, anomalies can be (but are not limited to) defective products on an assembly line, viruses, threats, and/or intruders on a computer, and/or disease diagnoses for a patient. In some embodiments, viruses, threats, and/or intruders can be identified by analyzing the expected behavior of a device with anomalous behavior. In various embodiments, viruses, threats, and/or intruders can be identified by analyzing files and/or filesystems for anomalous content and/or behavior. In certain embodiments, medical diagnostics from a patient can be analyzed to identify relevant disease diagnoses. In many embodiments, the existence of coincidence between data streams can be used to define metrics for predictive performance. In various embodiments, metrics can be used to compare algorithms. Metrics can be (but are not limited to) covariance and/or correlation. In many embodiments, processes modify metrics to be continuous to train machine learning models, including (but not limited to) deep neural networks, to identify anomalous conditions.

In various embodiments, a null hypothesis that data streams are uncorrelated under normal conditions and joint anomalies (joint events) occur by chance is introduced. The number of observed joint anomalies in the data streams is then compared to the number of expected anomalies under the null hypothesis to measure efficacy of an algorithm. The more joint anomalies observed, the more sensitive the algorithm is, which is analogous to recall. The fewer non-joint anomalies observed, the smaller the fraction of anomalies expected from the null hypothesis, which is analogous to improved precision.

Deep Canonical Correlation Analysis (DCCA) is another method for anomaly detection, but differs in at least two key aspects. First, DCCA maximizes correlation, but processes in accordance with various embodiments of the invention can maximize the covariance and/or related quantities. Second, where DCCA typically predicts into a multi-dimensional latent space to achieve higher correlation, processes in accordance with various embodiments of the invention predict into a single dimension which can be interpreted as a detection of anomalies. These same differences also apply to correlation loss functions which are used in Correlation Neural Networks, which are closely related to DCCA.

In various embodiments, the assumption of coincidence between two data streams avoids the need for pre-training on a labeled dataset. This is unlike self-training, where a network is pre-trained on a small labeled dataset, then self-labels additional examples from an unlabeled dataset with high-confidence labels to continue training the network.

In various embodiments, the number of joint anomalies found in time interval T, with algorithm parameters $\theta_q$, $\theta_s$ can be represented by $J(\theta_q, \theta_s)$. In some embodiments, the number of joint anomalies expected to be observed under the null hypothesis (analogous to false positives) can be represented by $N(\theta_q, \theta_s)$. In certain embodiments, the number of joint anomalies that are estimated to be true out of the total observed, i.e., the excess of anomalies (analogous to true positives, which will stand in for recall) can be represented by $R(\theta_q, \theta_s)=J-N$. In some embodiments, the ratio of the excess of anomalies found over the null hypothesis ($R(\theta_q, \theta_s)$) to the total number of anomalies found (J) (analogous to precision) can be represented by $P_E(\theta_q, \theta_s)=R(\theta_q, \theta_s)/J=(J-N)/J$.

In various embodiments, as the threshold for an anomaly decreases, more joint anomalies are found and $R(\theta_q, \theta_s)$ is expected to increase. At the same time, $J(\theta_q, \theta_s)$ is expected to grow faster so $P_E$ should decrease. A Pareto front that maximizes both $R(\theta_q, \theta_s)$ and $P_E(\theta_q, \theta_s)$ defines optimal choices of $\theta_q$, $\theta_s$, and the area under the curve signifies the algorithm's quality. To calculate these quantities in accordance with various embodiments of the invention, a simple case in the limit of rare anomalies is defined alongside an assumption that within each data streams anomalies are independent and identically distributed. For example some embodiments of the invention can define the limit of rare anomalies as $\tau R(\theta_q, \theta_s)/T \ll 0$, $n_q$ as the number of non-joint q anomalies within period T, $n_s$ as the number of non-joint s anomalies within period T, $q_0=1-(1-\tau/T)^{n_q}$ as the probability of at least one q anomaly occurring in a τ sec window, and $N=q_0 n_s$ as the expected number of joint anomalies under the null hypothesis.

In some embodiments, the null hypothesis should be chosen to fit the problem. In various embodiments, a precise null hypothesis would use a Poisson distribution. In certain embodiments, the metrics can be used to choose parameters of the models, e.g., thresholds $\theta_q$, $\theta_s$, to maximize $P_E(\theta_q, \theta_s)$ and $R(\theta_q, \theta_s)$. The two metrics can be combined in different ways. In some embodiments of the invention, the two metrics can be combined by a simple product $P_E(\theta_q, \theta_s)R(\theta_q, \theta_s)$. In various embodiments, the two metrics can be combined by the $F_\beta$ score.

In various embodiments, recall is defined as recall=(true positive/(true positive+false negative))=>$R(\theta_q, \theta_s)$=estimated true positive. In certain embodiments of the invention, there is no way to assess the false negative rate or confirm true positives. In some embodiments, $R(\theta_q, \theta_s)$ is an estimate of the number of true positives, so $R(\theta_q, \theta_s)$ can act as an unnormalized estimation of recall.

In some embodiments, precision is defined as precision= (true positive/(true positive+false positive))=>$P_E(\theta_q, \theta_s)$= (estimated true positive/(true positive+false positive)). In various embodiments, there is no normalization, therefore $R(\theta_q, \theta_s)$ has units of number of events and $P_E(\theta_q, \theta_s)$ is dimensionless, which can complicate the choice of $\beta$ in $F_\beta$. In certain embodiments, the normalization can be estimated from a prior or learned during the optimization process.

In various embodiments of the invention, two scalar threshold parameters $\theta_q$ and $\theta_s$ can be defined in two functions $p_q(\theta_q)$ and $p_s(\theta_s)$ that represent the probability that the sample is anomalous. In some embodiments, $\theta_q$ and $\theta_s$ can be high-dimensional. In certain embodiments, the continuous values $p_s$ and $p_q$ in [0,1] can be swapped in for the definitions of J and N, meaning that now $J=\langle p_s p_q \rangle$, $N=\langle p_s \rangle \langle p_q \rangle$, and $R(\theta_q, \theta_s)=J-N=\langle p_s p_q \rangle - \langle p_s \rangle \langle p_q \rangle$. In order to maximize $R(\theta_q, \theta_s)$, some embodiments of the invention optimize $\theta_q$ and $\theta_s$.

In many embodiments of the invention, $J(\theta_q, \theta_s)$ denotes the fraction of joint anomalies found in the data streams. The anomaly fraction in the data streams (i.e., actual positives) can be represented by a. In certain embodiments, the data streams are labeled for each of the n examples in the data streams, and can be evaluated with the supervised classification metric Fa. In various embodiments, the data streams are unlabeled, and can be evaluated with the unsupervised classification metric $F^\wedge_\beta$ that relies on an estimate of the fraction of false positives, represented as $D(\delta_s, \theta_q)$. In many embodiments, $D(\delta_s, \theta_q)$ is based on an observation that disagreements between the models $A_{\theta_s}$ and $A_{\theta_q}$ reveal the false positive rate. In certain embodiments, it is assumed that s and q are independent conditioned on knowing the true label. In some embodiments, the supervised and unsupervised classification metrics can be represented as $F_\beta=((1+\beta^2)(J-FP/n)/(J+\alpha\beta^2))=>F^\wedge_\beta=((1+\beta^2)(J-D)/(J+\alpha\beta^2))$ where FP is the number of false positives, and $\beta$ balances the weighting of precision and recall. In many embodiments, $F^\wedge_\beta$ can be used to compare algorithms or select model hyperparameters in the same manner as $F_\beta$. In certain embodiments, the extremes are $P^\wedge=F^\wedge_0$ and $R^\wedge=F^\wedge_\infty$. In various embodiments, $P^\wedge$ corresponds to precision P and $R^\wedge$ corresponds to recall R.

In certain embodiments, $F^\wedge_\beta$ requires an estimate of the fraction of false positives $D(\delta_s, \theta_q)$. In many embodiments, the false positive rate is revealed by observing the disagreements between $A_{\theta_s}$ and $A_{\theta_q}$. Disagreements can be any anomalies found in one model that are not found in another model. In various embodiments, under the assumption that s and q are independent conditioned on knowing the true label, the disagreement rates provide an upper bound on the true fraction of false positives. In some embodiments, the fraction of joint events J in the data and the estimated fraction of false positives D can be represented as $J(\theta_q, \theta_s)=\mu_{sa}$ and $D(\theta_s, \theta_q)=((\mu_s-\mu_{sq})/(1-\mu_q))((\mu_q-\mu_{sq})/(1-\mu_s))$ where $\mu_s=\mathbb{E}_{s\in D_s}[p_s]$, $\mu_q=\mathbb{E}_{q\in D_q}[p_q]$, and $\mu_{sq}=\mathbb{E}_{(s,q)\in D}[p_s p_q]$. In certain embodiments, the unsupervised metric can be represented as $F^\wedge_\beta=(1+\beta^2)((\mu_{sq}-p_s p_q)/(\mu_{sq}+\alpha\beta^2))((1-\mu_{sq})/((1-p_s)(1-\mu_q)))$. In various embodiments, a majority of the events can be labeled as 0. In certain embodiments, the anomalous class can be the minority class. In some embodiments, precision and recall are not invariant under a labeling flip. In many embodiments, an additional constraint can be imposed that anomalies exist and are rare, which can be represented by $(0<\mu_{sq}\leq\mu_s, \mu_q\leq 0.5)$. In certain embodiments, only the quantity $\alpha\beta^2$ needs to be specified to maximize $F^\wedge_\beta$. In some embodiments, an incorrect estimate of $\alpha$ maximizes a metric for a different value of $\beta$. In various embodiments, the maximizers of $P^\wedge$ and $R^\wedge$ do not depend on a.

In some embodiments, the categorical case $p_s, p_q \in \{0, 1\}$ can be assumed. One example of this case is when two models $A_{\theta_s}$ and $A_{\theta_q}$ already exist and are parameterized by two thresholds. In various embodiments, the continuous case $p_s, p_q \in [0, 1]$ can be assumed, which can train more complex models. In some embodiments, these complex models include (but are not limited to) deep neural networks trained with gradient-based optimizers. In various embodiments, the continuous case allows for clustering of normal and anomalous data without having to first build individual anomaly detection models.

In some embodiments, $p_s(s)=A_{\theta_s}(s)$ and $p_q(q)=A_{\theta_q}(q)$ for some parameter $\theta_s$ and $\theta_q$, which can map $D_s$ to any element of $[0,1]^n$ where n is the number of samples in a training set. In many embodiments, maximizers $p^*_s$ and $p^*_q$ of $F^\wedge_\beta$ are nearly categorical solutions. This means the continuous extension to $p_s, p_q \in [0, 1]$ is almost equivalent to the original categorical case, and the method behaves as a nearly hard clustering algorithm. In certain embodiments, holding $p_s$ fixed shows that the optimal $p^*_q$ is nearly categorical, which can be represented by $p^*_q(q) \in \{0, p, 1\}$ for some $p \in [0,1]$ and all q. In certain embodiments, $p \notin \{0, 1\}$ can occur if the constraint $\mu_q \leq 0.5$ is tight. In certain embodiments, by holding $p_s$ fixed and then the new $p_q$ fixed, only nearly categorical solutions need to be considered for $p_s$ and $p_q$.

In certain embodiments, the anomalous set A and normal set $A^c$ can overlap in data inputs s and q, which can be referred to as (but is not limited to) noise. In various embodiments, under some mild conditions, the optimal solution can label the noiseless parts of s and q according to their true cluster labels. The noisy part of q, which can be represented as the set C, is labeled as anomalous in some embodiments, but the label for the noisy part of s, which can be represented as the set B, depends on the value of $\beta$. In certain embodiments, when $\beta=0$ precision is prioritized, and an optimal solution may not assign the noisy examples in B to the anomalous class. In various embodiments, when $\beta=\infty$ recall is prioritized, and an optimal solution may label B as anomalous. In many embodiments, this trade-off can occur at a critical $\beta_{crit}$ that can depend on the noise level in s and q.

In numerous embodiments, a continuous process can perform both feature representation and classification simultaneously and in an unsupervised manner.

Several strategies for varying the tradeoff between maximizing recall and maximizing precision can be used in accordance with various embodiments of the invention. In some embodiments, processes choose a threshold on the output prediction by converting the continuous output to categorical, normal and/or anomalous, outputs. In many embodiments, recalibration concepts such as temperature scaling are applied. In some embodiments, the concepts of excess $(R(\theta_q, \theta_s))$ and excess-precision $(P_E(\theta_q, \theta_s))$ can be used to guide recalibration. In certain embodiments, rather than training with covariance or correlation, combined metrics such as exponents can be utilized. For example, exponents can be added to the definition of covariance using the equation $R(\theta_q, \theta_s) = \langle p_s p_q \rangle^\alpha - (\langle p_s \rangle \langle p_q \rangle)^\alpha$ where if $\alpha$ equals 1, $R(\theta_q, \theta_s)$ returns the covariance and favors recall. Smaller values of $\alpha$ favor precision. In some embodiments, $\alpha$ can be greater than one. In many embodiments, each model could output more than one value, with different metrics applied to different outputs. For example, each metric could be given a different value of $\beta$ (for an $F_\beta$ metric) or $\alpha$ (for an exponent). In many embodiments, each output could maximize covariance while also trying to match a particular value. For example, each output could maximize covariance while also trying to match a particular value of $P_E(\theta_q, \theta_s)$. In certain embodiments, the quantity $F^\hat{}_\beta$ can be used to balance the number of anomalous events found, maximizing the recall, and the confidence in the prediction, maximizing precision.

Turning now to the drawings, systems and methods for detecting anomalies in accordance with various embodiments of the invention are illustrated.

An example of detecting anomalies in accordance with an embodiment of the invention is illustrated in FIG. 1.

Process 100 receives (105) a first data stream collected from a first sensor. Data streams in accordance with several embodiments of the invention contains one or more data points. In numerous embodiments, data streams include data from multiple sensors, where the sensors may be of a certain type or a combination of different types. Sensors can include a device and/or process that records data. In some embodiments, sensors log data from a station on an assembly line. Sensors in accordance with many embodiments of the invention can include (but are not limited to) light sensors, cameras, weight sensors, temperature sensors, sound sensors, etc. In various embodiments, sensors can include a program that logs data from a device. In certain embodiments, data streams include log data from a device log (e.g. regarding performance of the device).

The process identifies (110) a first set of anomalies in the first data stream using a first model. Models may identify anomalies in one or more data streams. Data streams may be sent to one or more models. In various embodiments, models are parameterized functions. In some embodiments, the parameters of parameterized functions are modified. In many embodiments, models have been trained to detect anomalies. In many embodiments, the anomalies identified are imputed from other parameters and are not directly exposed. In still many embodiments, models are untrained to detect anomalies when sent a data stream.

Process 100 receives (115) a second data stream collected from a second sensor. The process identifies (120) a second set of anomalies in the second data stream using a second model. In some embodiments, sensors collect data on substations of an assembly line. In various embodiments, a first set of one or more sensors collects data on a substation of an assembly line and a second set of one or more sensors collects data on a final product of the assembly line.

Process 100 determines (125) a set of joint anomalies. Joint anomalies in accordance with many embodiments of the invention include anomalies found in different data streams that are associated with each other. In some embodiments, joint anomalies can be determined when an anomaly in a first set of anomalies and an anomaly in a second set of anomalies occur within a predetermined amount of time. In certain embodiments, joint anomalies are determined using thresholds. In many embodiments, thresholds can include (but are not limited to) a confidence level. In various embodiments, thresholds for determining a joint anomaly can be modified. Processes in accordance with a variety of embodiments of the invention can determine joint anomalies based on one or more various factors, such as (but not limited to), a time interval, a time offset, event types, etc. In various embodiments, joint anomalies are determined by maximizing correlation. In many embodiments, processes determine joint anomalies based on comparisons to a null hypothesis. In certain embodiments, processes determine joint anomalies based on comparisons to estimated false positive rates. A null hypothesis may be an assumption that the first and second data streams are uncorrelated and joint anomalies occur by chance.

Process 100 updates (130) the first and second models using the set of joint anomalies. In many embodiments, models are recalibrated to reflect the true confidence of the models. In some embodiments, the first and second models are updated by modifying the parameters of the models. In some embodiments, model parameters (e.g., thresholds) are updated to more accurately identify anomalies.

While specific implementations of detecting anomalies have been described above with respect to FIG. 1, there are numerous configurations of detecting anomalies, including, but not limited to, those using unparameterized functions, various machine learning models, and/or any other configuration as appropriate to the requirements of a given application.

Figure 2:
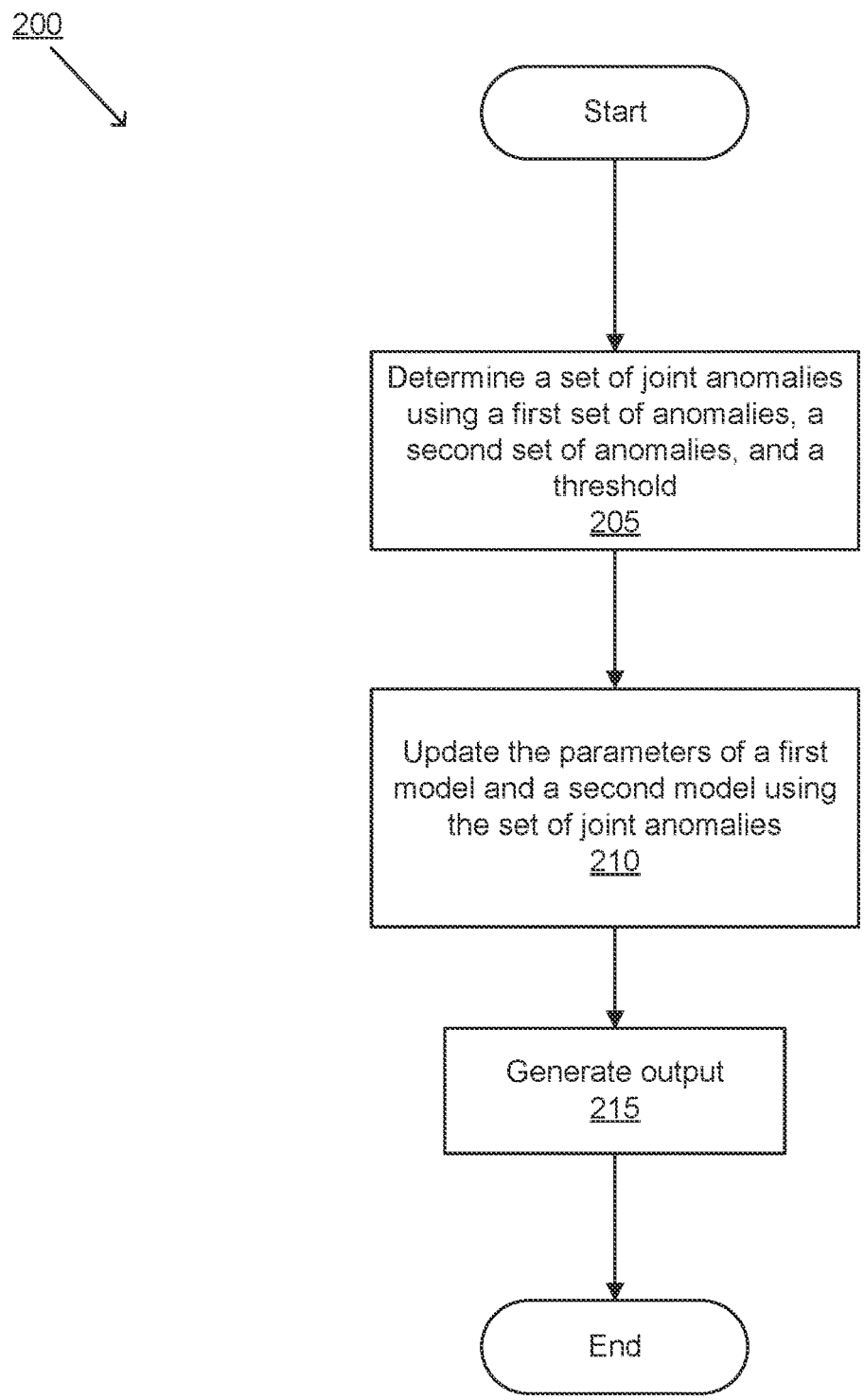
FIG. 2 is a flow chart illustrating a process to detect anomalies in accordance with an embodiment of the invention.

In many embodiments, processes can continuously train anomaly detection models and use the joint anomaly detection to generate outputs and/or control systems. An example of a process for detecting anomalies in accordance with an embodiment of the invention is illustrated in FIG. 2.

Process 200 determines (205) a set of joint anomalies using a first set of anomalies, a second set of anomalies, and a threshold. The process updates (210) a first model and a second model using the set of joint anomalies.

Process 200 generates (215) output. In some embodiments, outputs contain the set of joint anomalies. In various embodiments, outputs contain trained models, parameters, and/or data streams. In many embodiments, outputs may be displayed on graphical interfaces and/or sent somewhere via a network. In some embodiments, outputs include an event that occurs automatically if a joint anomaly has been identified. For example, events in accordance with several embodiments of the invention can include an automatic shutoff.

While specific implementations of detecting anomalies have been described above with respect to FIG. 2, there are numerous configurations of detecting anomalies, including, but not limited to, those using unparameterized functions, various machine learning models, and/or any other configuration as appropriate to the requirements of a given application.

Figure 3:
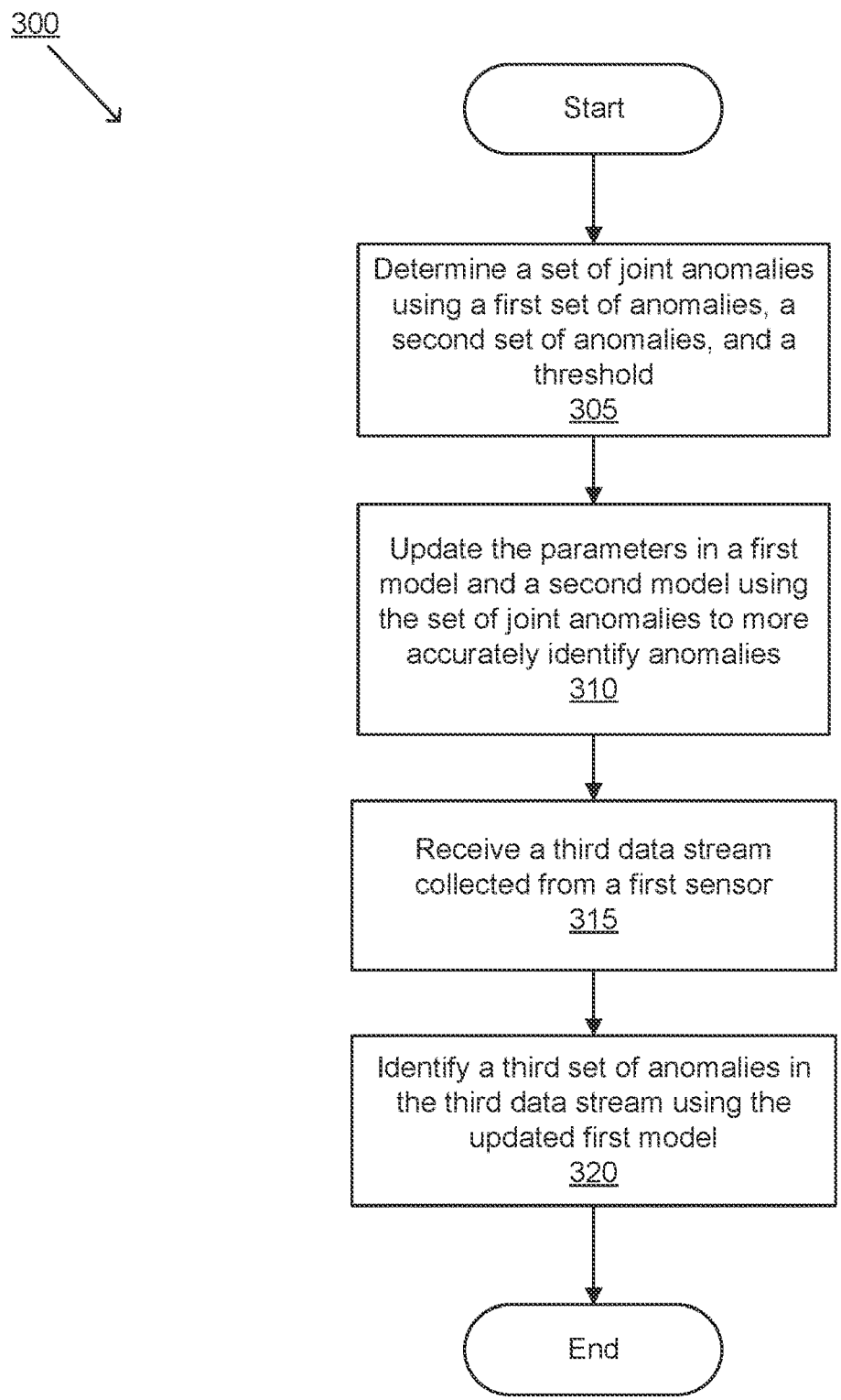
FIG. 3 is a flow chart illustrating a process to detect anomalies in accordance with an embodiment of the invention.

Once anomaly detection models in accordance with numerous embodiments of the invention are trained, they can be used to detect individual anomalies for a given set of sensors separately (or in addition to) joint anomaly detection. In some embodiments, anomaly detection models can be trained on a first set of sensors to detect anomalies for use with a different second set of sensors. An example of a process for detecting anomalies in accordance with an embodiment of the invention is illustrated in FIG. 3.

Process 300 determines (305) a set of joint anomalies using a first set of anomalies, a second set of anomalies, and a threshold. In a number of embodiments, different sets of anomalies can be identified from different data streams using separate models.

Process 300 updates (310) the first model and second models to more accurately identify anomalies using the set of joint anomalies.

Process 300 receives (315) a third data stream collected from the first sensor. The process identifies (320) a third set of anomalies in the third data stream using the updated first model. In some embodiments, the third set of anomalies is used to evaluate the anomaly detection of the updated first model. In various embodiments, the first set of anomalies and third set of anomalies are compared to evaluate the anomaly detection of the updated first model.

While specific implementations of detecting anomalies have been described above with respect to FIG. 3, there are numerous configurations of detecting anomalies, including, but not limited to, those using unparameterized functions, various machine learning models, and/or any other configuration as appropriate to the requirements of a given application.

Figure 4:
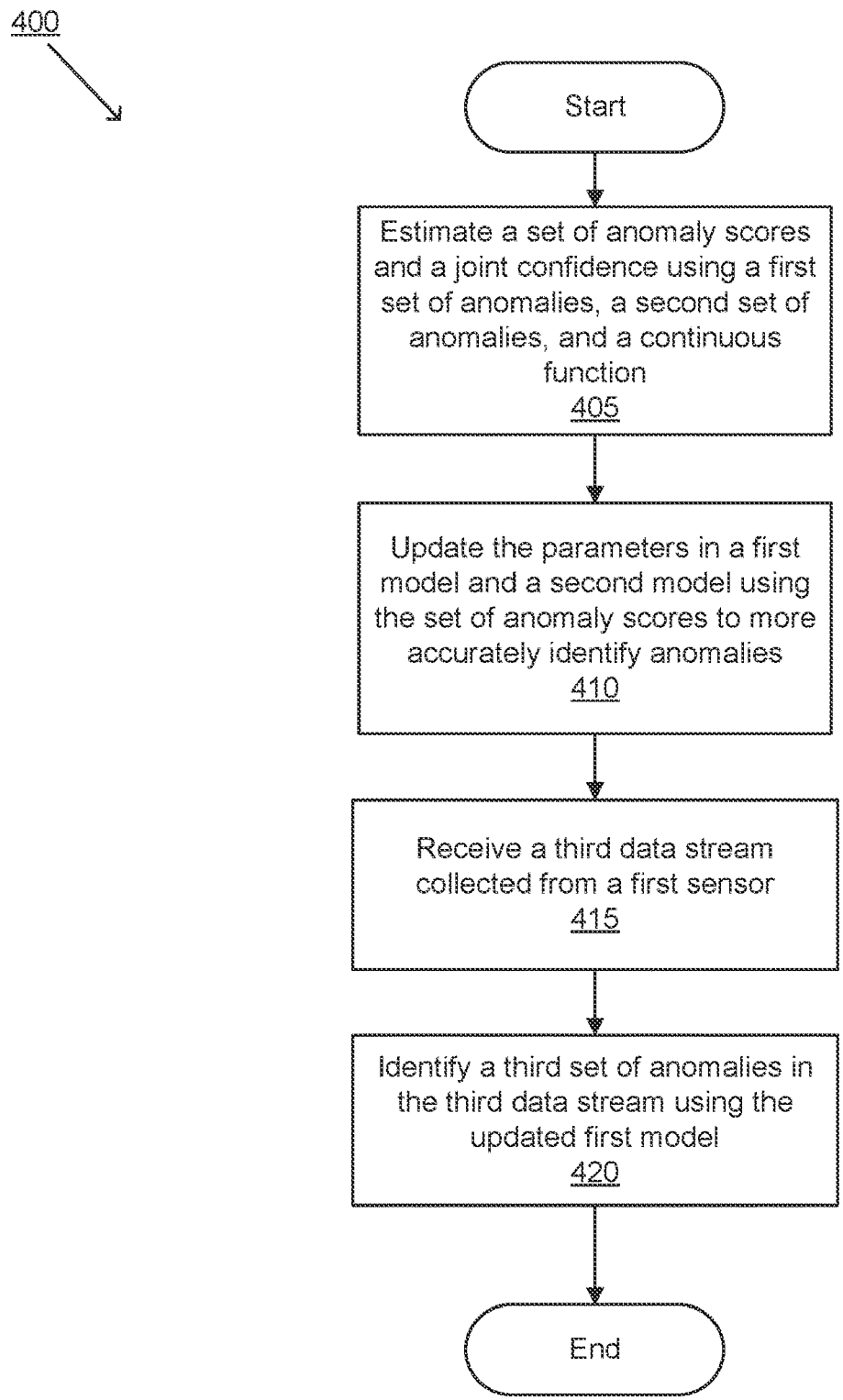
FIG. 4 is a flow chart illustrating a process to detect anomalies in accordance with an embodiment of the invention.

In some embodiments of the invention, anomaly detection models can be trained using a continuous function that estimates a joint confidence. An example of a process for detecting anomalies in accordance with an embodiment of the invention is illustrated in FIG. 4.

Process 400 estimates (405) a set of anomaly scores and a joint confidence using a first set of anomalies, a second set of anomalies, and a continuous function. In some embodiments, a set of anomaly scores is a label of whether a data point is an anomaly. In many embodiments, the joint confidence is a metric for determining whether anomalies found in both the first and second sets of anomalies are anomalous. In various embodiments, a continuous function can cluster normal and anomalous data without having to first build anomaly detection models.

Process 400 updates (410) a first model and second model to more accurately identify anomalies using the continuous function. In some embodiments, the first and second models are deep neural networks. In various embodiments, the first model and second model are not built until they are updated using the continuous function.

Process 400 receives (415) a third data stream collected from the first sensor. The process identifies (420) a third set of anomalies in the third data stream using the updated first model. In some embodiments, the third set of anomalies is used to evaluate the anomaly detection of the updated first model. In various embodiments, the first set of anomalies and third set of anomalies are compared to evaluate the anomaly detection of the updated first model.

While specific implementations of detecting anomalies have been described above with respect to FIG. 4, there are numerous configurations of detecting anomalies, including, but not limited to, those using unparameterized functions, various machine learning models, and/or any other configuration as appropriate to the requirements of a given application.

While specific processes for detecting anomalies are described above, any of a variety of processes can be utilized to detecting anomalies as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted. Although the above embodiments of the invention are described in reference to detecting anomalies in multi-modal data streams, the techniques disclosed herein may be used in any type of multi-modal data analysis, including training deep neural networks.

A. Systems for Detecting Anomalies

1. Anomaly Detection System

Figure 5:
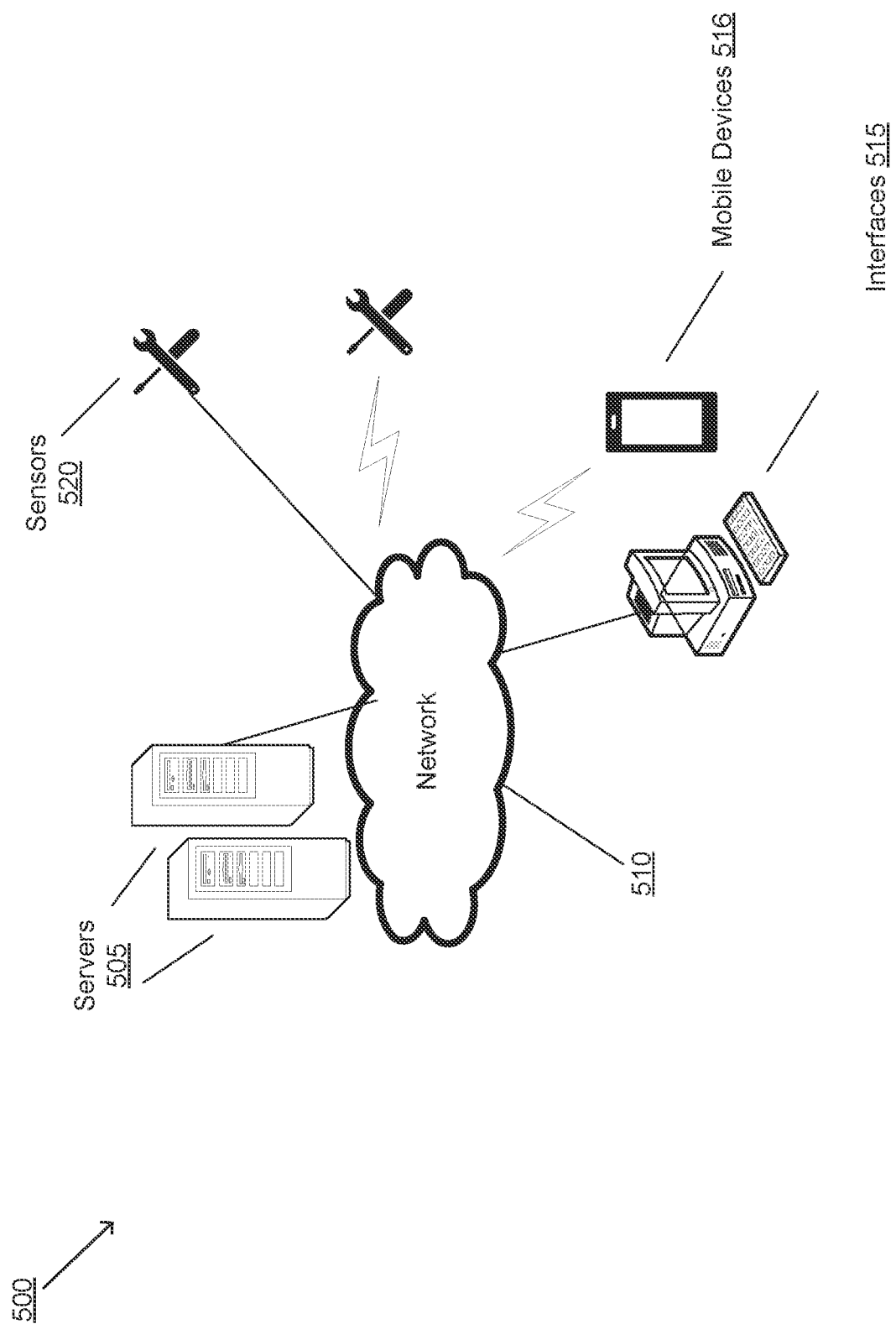
FIG. 5 is a system overview illustrating anomaly detection in accordance with an embodiment of the invention.

An example of an anomaly detection system that detects anomalies in accordance with an embodiment of the invention is illustrated in FIG. 5. Network 500 includes a communications network 510. The communications network 510 is a network such as the Internet that allows devices connected to the network 510 to communicate with other connected devices. Servers 505 are connected to the network 510. The servers 505 are a group of one or more servers communicatively connected to one another via internal networks that execute processes that provide cloud services to users over the network 510. One skilled in the art will recognize that an anomaly detection system may exclude certain components and/or include other components that are omitted for brevity without departing from this invention.

For purposes of this discussion, cloud services are one or more applications that are executed by one or more server systems to provide data and/or executable applications to devices over a network. The servers 505 may include any number of servers and any additional number of servers may be connected to the network 510 to provide cloud services. In accordance with various embodiments of this invention, an anomaly detection system that uses systems and methods that detect anomalies in accordance with an embodiment of the invention may be provided by a process being executed on a single server system and/or a group of server systems communicating over network 510.

Sensors 520 may connect to the network 510 to send data streams to the servers 505 in accordance with various embodiments of the invention. In the shown embodiment, the sensors 520 are shown as connected to the network 510 using both a conventional "wired" connection and a wireless connection. A wireless connection is a connection that uses Radio Frequency (RF) signals, Infrared signals, or any other form of wireless signaling to connect to the network 510. Sensors 520 may connect to the network 510 via a conventional "wired" connection or a wireless connection without departing from this invention.

Users may use interfaces 515 and mobile devices 516 that connect to the network 510 to perform processes that detect anomalies in accordance with various embodiments of the invention. In the shown embodiment, the interfaces 515 are shown as desktop computers that are connected via a conventional "wired" connection to the network 510. However, the interfaces 515 may be a desktop computer, a laptop computer, a smart television, an entertainment gaming console, or any other device that connects to the network 510 via a "wired" connection. The mobile devices 516 connects to network 510 using a wireless connection. A wireless connection is a connection that uses Radio Frequency (RF) signals, Infrared signals, or any other form of wireless signaling to connect to the network 510. In the example of this figure, the mobile devices 516 is a smartphone. However, mobile devices 516 may be a mobile phone, Personal Digital Assistant (PDA), a tablet, or any other type of device that connects to network 510 via wireless connection without departing from this invention.

As can readily be appreciated the specific computing system used to detect anomalies is largely dependent upon the requirements of a given application and should not be considered as limited to any specific computing system(s) implementation.

2. Anomaly Detection Element

Figure 6:
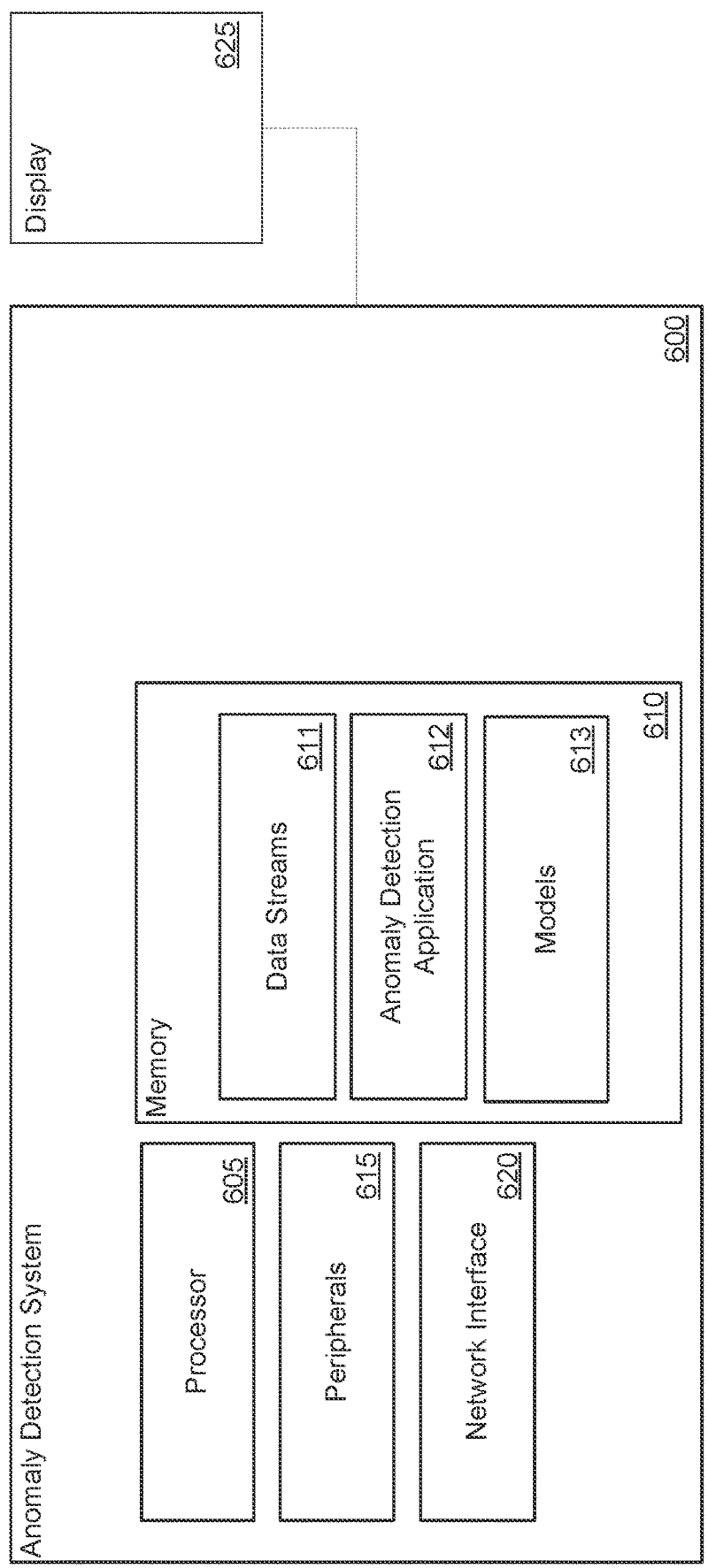
FIG. 6 conceptually illustrates a device for detecting anomalies in accordance with an embodiment of the invention.

An example of an anomaly detection element that executes instructions to perform processes that detect anomalies in accordance with an embodiment of the invention is illustrated in FIG. 6. Anomaly detection elements in accordance with many embodiments of the invention can include (but are not limited to) one or more of mobile devices, cameras, and/or computers. Anomaly detection element 600 includes processor 605, peripherals 615, network interface 620, and memory 610. One skilled in the art will recognize that an anomaly detection element may exclude certain components and/or include other components that are omitted for brevity without departing from this invention.

The processor 605 can include (but is not limited to) a processor, microprocessor, controller, or a combination of processors, microprocessor, and/or controllers that performs instructions stored in the memory 610 to manipulate data stored in the memory. Processor instructions can configure the processor 605 to perform processes in accordance with certain embodiments of the invention. In various embodiments, processor instructions can be stored on a non-transitory machine readable medium.

Peripherals 615 can include any of a variety of components for capturing data, such as (but not limited to) cameras, displays, and/or sensors. Sensors in accordance with many embodiments of the invention can include (but are not limited to) light sensors, cameras, weight sensors, temperature sensors, sound sensors, etc. In a variety of embodiments, peripherals can be used to gather inputs and/or provide outputs. Anomaly detection element 600 can utilize network interface 620 to transmit and receive data over a network based upon the instructions performed by processor 605. Peripherals and/or network interfaces in accordance with many embodiments of the invention can be used to gather inputs that can be used detect anomalies.

Memory 610 includes an anomaly detection application 612, models 613, and data streams 611. Anomaly detection applications in accordance with several embodiments of the invention can be used to detect anomalies.

In several embodiments, model data can store parameters for various models that can be used for various processes as described in this specification. Model data in accordance with many embodiments of the invention can be updated through training on multimedia data captured on an anomaly detection element or can be trained remotely and updated at an anomaly detection element.

Multimedia data in accordance with a variety of embodiments of the invention can include various types of multimedia data that can be used in evaluation processes. In certain embodiments, multimedia data can include (but is not limited to) video, images, audio, etc.

Although a specific example of an anomaly detection element 600 is illustrated in this figure, any of a variety of anomaly detection elements can be utilized to perform processes for detecting anomalies similar to those described herein as appropriate to the requirements of specific applications in accordance with embodiments of the invention.

3. Anomaly Detection Application

Figure 7:
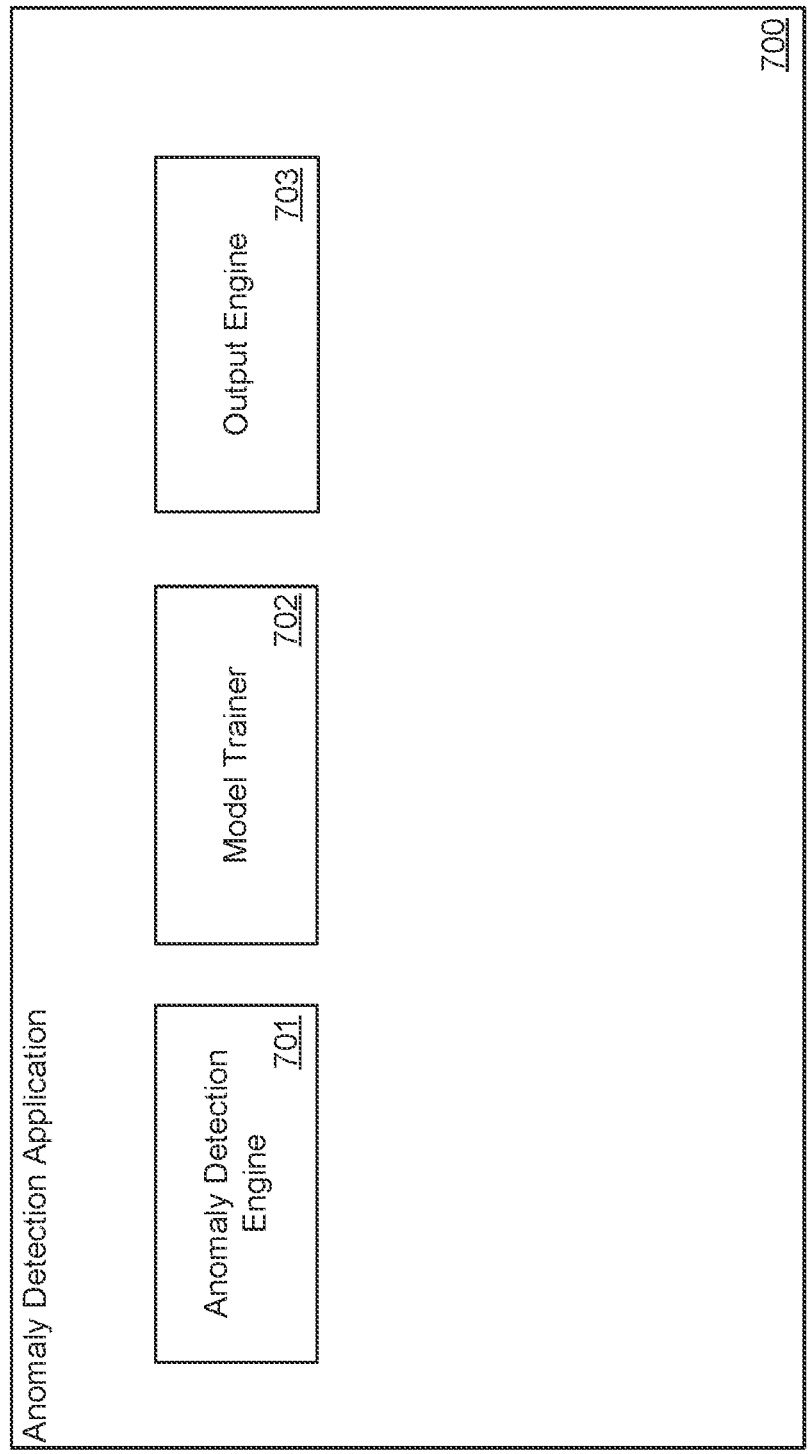
FIG. 7 conceptually illustrates an application for detecting anomalies in accordance with an embodiment of the invention.

An example of anomaly detection application for detecting anomalies in accordance with an embodiment of the invention is illustrated in FIG. 7. An anomaly detection application 700 includes anomaly detection engine 701, model trainer 702, and output engine 703. One skilled in the art will recognize that an anomaly detection application may exclude certain components and/or include other components that are omitted for brevity without departing from this invention.

Anomaly detection engines in accordance with various embodiments of the invention can be used to detect anomalies using models and data streams. In many embodiments, each model is a parameterized function that outputs the probability that the input is anomalous or not. In most embodiments, a model with lower confidence thresholds lead to a larger number of anomalous predictions. In some embodiments, the confidence and/or number of detected anomalies are imputed from other parameters and are not directly exposed. In various embodiments, the confidence and/or number of detected anomalies are imputed by maximizing the covariance of the output of the models.

Model trainers in accordance with various embodiments of the invention can be used to train models. In some embodiments, models are trained using one or more data streams. In various embodiments, models are updated using a set of joint anomalies. In many embodiments, model trainers can train models based on a training function that modifies parameters based on the outputs of all the parameterized models when provided many inputs. Models may be found in accordance with several embodiments of the invention by identifying the maximum of a training function. In many embodiments, a model has tunable parameters that balance the Pareto optimal tradeoff between confidence in the anomaly detection predictions and the number of anomalous events predicted.

Output engines in accordance with several embodiments of the invention can provide a variety of outputs to a user, including (but not limited to) detected anomalies, data streams that contained an anomaly, sets of joint anomalies, etc. In a variety of embodiments, output engines can trigger an event when joint anomalies are detected. In some embodiments, these events include (but are not limited to) sending an automatic shutoff signal.

Although a specific example of an anomaly detection application is illustrated in this figure, any of a variety of anomaly detection applications can be utilized to perform processes for detecting anomalies similar to those described herein as appropriate to the requirements of specific applications in accordance with embodiments of the invention.

Although specific methods of detecting anomalies are discussed above, many different methods of detecting anomalies can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method to train models to detect anomalies in multi-modal data streams, comprising:
   receiving a first data stream collected from a first sensor;
   identifying a first set of anomalies in the first data stream using a first model;
   receiving a second data stream collected from a second sensor;
   identifying a second set of anomalies in the second data stream using a second model;

determining a set of joint anomalies using the first set of anomalies, second set of anomalies, and a threshold, wherein a threshold is a confidence level; and updating the first and second models using the set of joint anomalies.

2. The method of claim 1, wherein updating the first and second models further comprises updating a set of parameters of each of the first and second models.

3. The method of claim 2, further comprising updating the parameters of the first and second models to identify true positive anomalies at a rate higher than before the parameters are updated.

4. The method of claim 1, further comprising updating the threshold to identify true positive joint anomalies at a rate higher than before the threshold is updated.

5. The method of claim 1, wherein the first and second models are parameterized functions with modifiable parameters that balance the confidence level in the determined set of anomalies and a number of anomalous events predicted.

6. The method of claim 5, wherein the parameterized functions maximize a covariance of outputs of each of the parameterized functions.

7. The method of claim 5, wherein the parameterized functions maximize an unsupervised metric.

8. The method of claim 5, wherein the confidence level in the determined set of anomalies and the number of anomalous events are imputed from other parameters and are not directly exposed.

9. The method of claim 1, wherein receiving a data stream from a sensor comprises receiving data from a program that collects logs from a device.

10. The method of claim 1, further comprising generating output.

11. The method of claim 10, further comprising:
displaying the output via a graphical interface; and
sending the output over a network.

12. The method of claim 10, further comprising performing an event when the confidence level that a joint anomaly is detected exceeds the threshold.

13. The method of claim 12, wherein the event is an automatic shutoff.

14. The method of claim 1, further comprising:
receiving a third data stream collected from the first sensor; and
identifying a third set of anomalies in the third data stream using the updated first model.

15. The method of claim 1, wherein identifying the first set of anomalies is based on a set of one or more continuous functions.

16. The method of claim 1, wherein at least one of the first and second models is a neural network.

17. The method of claim 1, wherein the anomalies are represented by a group consisting of viruses, intrusions, and persistent threats.

18. The method of claim 1, wherein:
the first and second data streams are represented by different medical diagnostics; and
the anomalies are represented by disease diagnoses.

19. A method of detecting manufacturing anomalies on an assembly line, comprising:
receiving a first data stream from a first sensor, wherein the first sensor sends data from a station on the assembly line;
identifying a first set of anomalies in the first data stream using a first set of models;
receiving a second data stream from a second sensor, wherein the second sensor sends data from another station on the assembly line;
identifying a second set of anomalies in the second data stream using a second set of models;
determining a set of joint anomalies using the first set of anomalies, second set of anomalies, and a threshold; and
updating how anomalies are identified in the first and second set of models using the set of joint anomalies.

20. The method of claim 19, wherein the second sensor sends data from a final assembly line product.

* * * * *